United States Patent
Witkowski

(12) 
(10) Patent No.: US 6,487,546 B1
(45) Date of Patent: Nov. 26, 2002

(54) APPARATUS AND METHOD FOR AGGREGATE INDEXES

(75) Inventor: Andrew Witkowski, Foster City, CA (US)

(73) Assignee: Oracle Corporation, Redwood Shores, CA (US)

(*) Notice: Subject to any disclaimer, the term of this patent is extended or adjusted under 35 U.S.C. 154(b) by 0 days.

(21) Appl. No.: 09/141,345

(22) Filed: Aug. 27, 1998

(51) Int. Cl.[7] .............................................. G06F 17/30
(52) U.S. Cl. ............................... 707/1; 707/7; 707/100; 707/103 R; 707/104.1
(58) Field of Search ................................ 707/1, 2, 3, 4, 707/5, 7, 100, 103 R, 104.1, 104

(56) References Cited

U.S. PATENT DOCUMENTS

| | | | | |
|---|---|---|---|---|
| 5,511,190 A | * | 4/1996 | Sharma et al. | 707/100 |
| 5,702,018 A | | 12/1997 | Montgomery | |
| 5,713,020 A | * | 1/1998 | Reiter et al. | 707/102 |
| 5,832,519 A | * | 11/1998 | Bowen et al. | 707/203 |
| 5,903,888 A | * | 5/1999 | Cohen et al. | 707/3 |
| 5,947,326 A | | 9/1999 | O'Hern et al. | |
| 6,064,999 A | * | 5/2000 | Dalal | 707/2 |
| 6,098,074 A | * | 8/2000 | Cannon et al. | 707/200 |

OTHER PUBLICATIONS

The Breathing Bung by Ferm–Rite, Inc. [online]. Retrieved from the internet: URL:firm–rite.com. Mar. 17, 2001.

Alasco–Barrel Bungs [online] Alasco.Rubber & Plastics Corp. Retrieved from the internet: URL:alasco.com/bungs.htm Feb. 7, 2001.

* cited by examiner

*Primary Examiner*—Frantz Coby
(74) *Attorney, Agent, or Firm*—Hickman Palermo Truong & Becker LLP; Brian D. Hickman; Craig G. Holmes

(57) ABSTRACT

An aggregate index is used for accessing an aggregate value associated with one or more rows of a database table. The aggregate values are stored in the index entries of the index, thus allowing determination of aggregate values without accessing the underlying database table. The aggregate index is created by determining an aggregate value associated with an index entry, and storing the aggregate value with the index entry. The aggregate value is determined by accessing information corresponding to the index entry and processing the information. In the case of an index entry in the form of a branch node, the information might be aggregate values from other nodes, or values of items in the database pointed to by the index entries that are leaf nodes. The aggregate values may be stored in index entries of any type of index.

74 Claims, 10 Drawing Sheets

| x | y |
|---|---|
| 1 | 2 |
| 1 | 5 |
| 1 | 8 |
| 1 | 5 |
| 2 | 6 |
| 2 | 3 |
| 3 | 3 |
| 3 | 9 |
| 3 | 9 |
| 4 | 8 |
| 4 | 1 |

| KEY VALUE 1 | AGGREGATE INFO | ROW IDS |
|---|---|---|
| KEY VALUE 2 | AGGREGATE INFO | ROW IDS |
| KEY VALUE 3 | AGGREGATE INFO | ROW IDS |
| KEY VALUE 4 | AGGREGATE INFO | ROW IDS |
| . . . | | |
| KEY VALUE n | AGGREGATE INFO | ROW IDS |

Fig. 4

APPARATUS AND METHOD FOR AGGREGATE INDEXES

I. BACKGROUND OF THE INVENTION

A. Field of the Invention

The present invention relates generally to database systems, and in particular to a database system using an aggregate index.

B. Description of the Prior Art

Relational databases typically store information in tables comprised of one or more rows, each row consisting of one or more fields, and each field storing a value for a respective column. The tables are managed by a database management system (DBMS). The DBMS receives queries for the database, and retrieves information from the database in response to the query. The DBMS also updates information in the database.

In order to process a query, a DBMS may require information stored in one or more rows from a database table. To find the required rows in a table, the DBMS either scans all the rows of the table or uses an index to locate the required rows. Some database queries (hereinafter "aggregate queries") request information that is based on information related to one or more rows in the database tables. Such information is referred to as aggregate information. The requested aggregate information could be, for example, the average or sum of the values stored in the second field of the rows whose first field stores a particular value.

Figure 1:
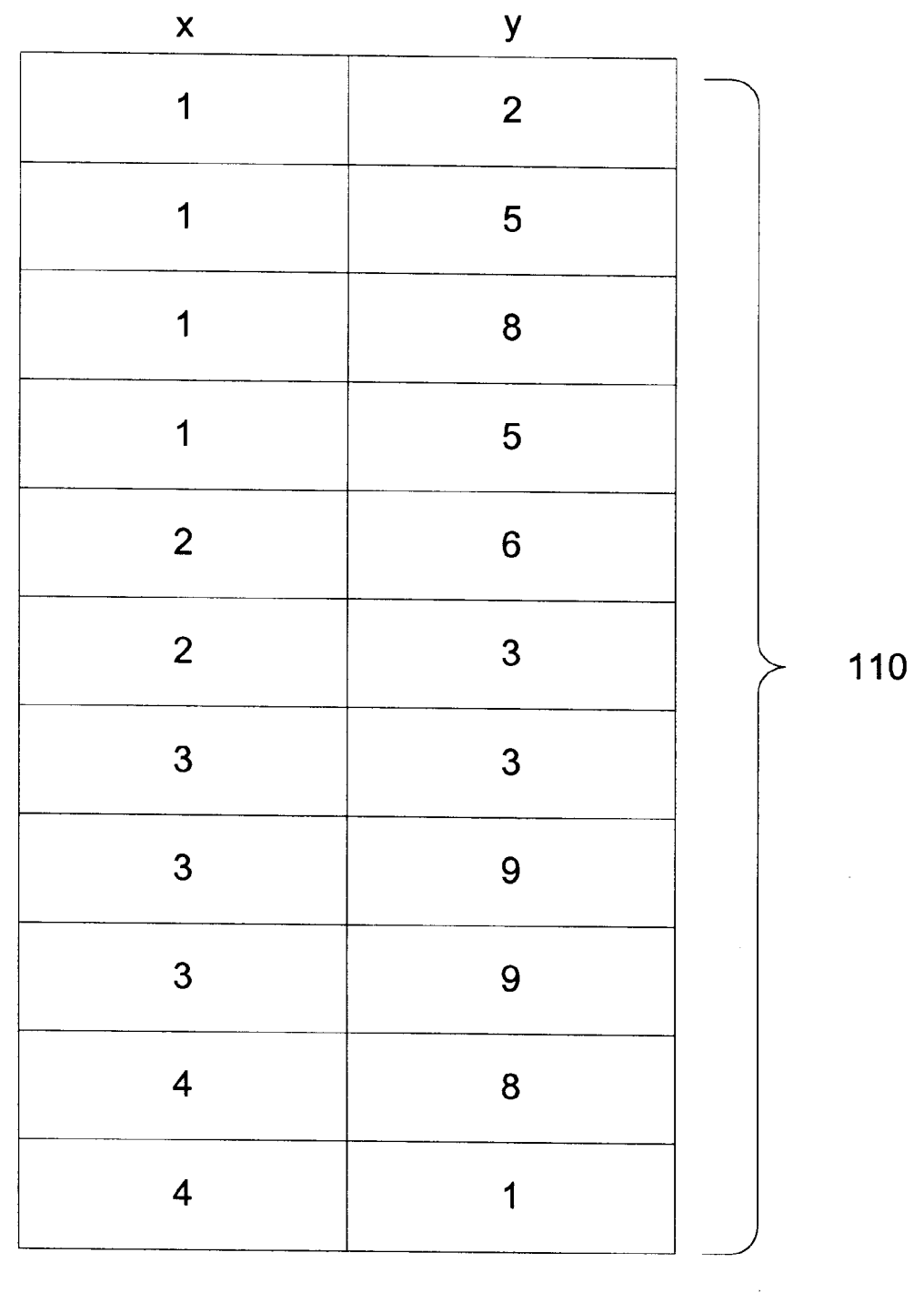

FIG. 1 shows a typical database table T 110 containing two columns, x and y. Consider an aggregate query which requests, for each respective value for column x stored in T, the average of the values stored for column y in the rows of T that store the respective value for column x.

select x, avg (y)

from T group by x;

A DBMS typically would perform the above query by sorting the rows of T on column x, and then determining the average value for the group of column y values corresponding to each value of column x.

For example, for column x, value 1, the average of corresponding y values (i.e., 2, 5, 8, and 5) is equal to (2+5+8+5)/4=5; for column x, value 2, (6+3)/2=4.5; for column x, value 3, (3+9+9)/3=7; and for column x, value 4, (8+1)/2=4.5. Determining aggregate information in this manner, however, requires the DBMS to scan the entire table, which can be extremely CPU and I/O intensive.

To reduce the time it takes to locate rows in a table, an index to the table may be used. An index for a table is based on one or more columns of the table (referred to as the "key") and contains one or more entries, each entry corresponding to a respective value of the key and storing information (typically location) relating to one or more rows in the table that store the respective value of the key. One commonly used type of index, a B-tree index, includes a tree data structure of branch nodes and, at the bottommost level, leaf nodes. Each branch node comprises one or more entries, each entry specifying a range of key values and a pointer to another branch node or to a leaf node. Each leaf node comprises one or more entries, each entry specifying the locations (e.g., rowIDs) of one or more rows storing a particular key value.

In the most common implementation of a B-tree, there is a separate entry for each rowID corresponding to a particular key value. In other implementations, a single entry stores all the rowIDs corresponding to a particular key. Each branch node contains information that is used by the DBMS to traverse the tree in order to arrive at the leaf node containing an entry that corresponds to a particular requested key value.

FIG. 2 is an example of such a B-tree index for the table T 110 shown in FIG. 1. The key for the index is column x of Table T 110. The tree is comprised of nodes 210, 212 and 214. Node 210 is a branch node. Branch nodes point to other branch nodes or to leaf nodes. FIG. 2 shows a single branch node, node 210, but more may be used. Each branch node includes at least one range field. The desired key or key range determines which branch should be followed from the node. In FIG. 2, for example, node 210 specifies two key ranges: <=2 and >2. Thus, a query looking for all values associated with column x values of 1 require traversal through the uppermost branch from node 210 because the value 1 is in the range of <=2.

The lowest level of nodes, nodes 212 and 214, are leaf nodes that point to or contain a linked list of rowIDs. The leaf nodes are connected in a doubly-linked list, indicated by link 216. Each rowID specifies a location of a row in the database. Nodes 212 and 214 contain key values corresponding to values in column x of table T 110 of FIG. 1. Node 212, value 1, points to a linked list of four rowIDs. The four rowIDs point to respective physical locations of the four rows of table T 110 that store a value of 1 in the field for column x. Node 212 with key value 2, node 214 with key value 3, and node 214 with key value 4 each point to respective linked lists of rowIDs pointing to corresponding rows.

The doubly-linked list can be used for operations that require obtaining values from a series of leaf nodes. A range scan is an example of such an operation. A range scan is performed by finding rows with keys in a given range. To perform a range scan using the doubly-linked list, the index is traversed to the leaf node associated with the beginning of the range. From that leaf node, the doubly-linked list is traversed through the leaf nodes until the leaf node at the end of the range is reached. Thus, the doubly-linked list is used instead of traversing the index from top to bottom to find each key value in the range.

An example of determining aggregate information is illustrative of how the index of FIG. 2 could be used. If the query on the database requests the average of y values for the rows of table 110 having an x value of 3, the DBMS first visits branch node 210, and determines that the desired key value 3 falls within the range ">2." The branch node corresponding to a key range of ">=2" points to leaf node 214. The DBMS then visits leaf block 214, which contains a leaf node corresponding to a key value of 3. This leaf node points to a linked list of rowIDs specifying the physical locations of rows of table T 110 that store a value of 3 for column x. The DBMS then uses the rowIDs to access the rows, and determine their average y value. The index, therefore, eliminates the need for scanning each row in the table, and provides a structure for accessing particular rows in the database more quickly.

The following is another example of an aggregate query:

select x, avg (y)

from T where 1<=T.x<=3 group by x;

This aggregate query can be processed by a range scan of the index. The range scan is basically performed in the same manner as a table scan, but in this case the value is constrained to be a value of column x between 1 and 3 (i.e., "where 1<=T.x<=3"). At node 210, the criteria "1<=T.x<=3"

is met by range <=2, which results in DBMS traversing the index to node 212. At node 212, the criteria 1<=T.x<=3 is met by the value 1, which points to a linked list of leaf nodes containing rowIDs pointing to the physical location of the values in column y corresponding to the column x, value 1. The corresponding y values are then accessed using the rowIDs. The DBMS repeats this process for column x, value 2, then traverses link 216 and repeats the process for column x value 3. Because value 3 is the end of the range, the DBMS stops accessing the values at the rowIDs associated with the column x values. The DBMS then determines the average of the accessed y values, thus completing the range scan. The process of stepping through the linked list of column x values, and accessing the physical locations corresponding to the rowIDs is extremely time consuming.

As the above examples indicate, traditional techniques for processing aggregate queries involve reading several index and table blocks to determine aggregate information. There is, therefore, a need for an apparatus, system, and method to facilitate faster processing of aggregate queries.

II. SUMMARY OF THE INVENTION

An apparatus and method consistent with the present-invention provides an aggregate index having entries that store aggregate information. The aggregate information represents one or more aggregate characteristics of one or more rows stored in a database. The present invention creates and maintains the aggregate index in response to operations on the database. By storing the aggregate information in the index entries, the DBMS does not have to access the underlying rows of the database each time the aggregate information is needed for an aggregate query.

Thus, the invention overcomes the problems of conventional systems described above. Additional advantages of the invention are apparent from the description, which follows, and may be learned by practice of the invention. It is to be understood that both the foregoing general description and the following detailed description are exemplary and explanatory only and are not restrictive of the invention, as claimed.

III. BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings, FIG. 1 shows a database table T;

FIG. 4 is a block diagram of an aggregate index consistent with the principles of the invention;

IV. DETAILED DESCRIPTION

Apparatus, systems and methods consistent with the principles of the present invention create, maintain, and use an aggregate index. The aggregate index is similar to a typical index. The aggregate index, however, stores precomputed aggregate information with one or more of the index entries. More particularly, the aggregate information stored in an index entry for a particular key value correspond to one or more rows of the index table storing the particular key value. The aggregate index is structurally similar to a regular index, and includes aggregate information stored with the index entries.

The aggregate index is, therefore, structurally similar to other known indexes. One embodiment of an aggregate index as a B-tree index is described below, but other aggregate indexes may be used based on other index structures. For example, although the index entries are described below in terms of branch nodes and leaf nodes of a B-tree, the principles of index entries storing aggregate information can be applied to any type of database index structure.

As is well understood in the art, each entry of an index may be associated with a single key value (e.g., B-tree leaf node), or a set of key values (e.g., B-tree branch node). The principles described herein apply to both types of index entries. That is, aggregate information may be stored in an entry associated with a single key value, or a set of key values, or both.

By storing aggregate information in an index entry for a particular key value, the aggregate information can be quickly determined merely by reading the index entry, instead of having to retrieve the table blocks containing the rows that store the particular key values. For example, in a B-tree index comprised of entries in the form of branch nodes and leaf nodes, aggregate information associated with one or more key values can be stored at each branch node or each leaf node, or both. Therefore, determining aggregate information for a key value, or range of key values, associated with an entry merely requires finding the appropriate entry in the aggregate index.

The aggregate information may be stored in an index entry in any manner that allows the DBMS to access the aggregate information. For example, the index entry may store the aggregate information in a predetermined location, or the index entry may point to the aggregate information in some way.

Database Architecture

Figure 3:
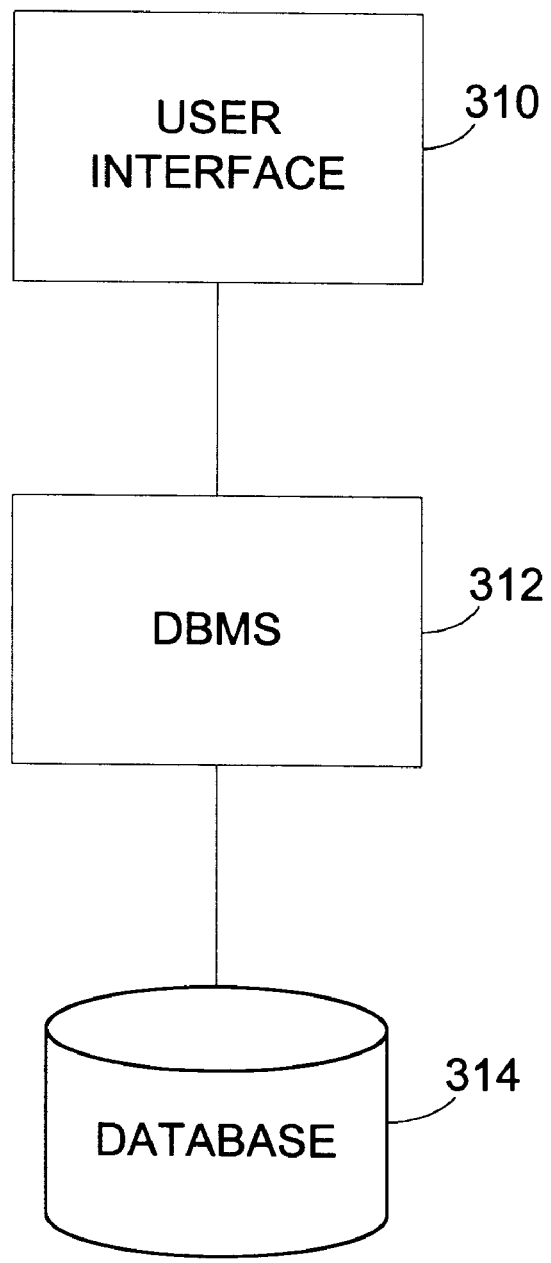
FIG. 3 is a block diagram showing a database architecture that may be used to create, use and maintain an aggregate index consistent with the principles of the present invention.

FIG. 3 is a block diagram showing a database architecture that may be used to create, use and maintain an aggregate index consistent with the principles of the present invention. The architecture comprises a user interface 310, a DBMS 312 and a database 314. DBMS 312 interacts with the user via user interface 310, and accesses and maintains database 314 in accordance with the user input.

DBMS 312 also creates, uses and maintains aggregate indexes in database 314 in accordance with the principles of the present invention. Aggregate index creation, use and maintenance will now be described in greater detail.

Aggregate Indexes

FIG. 4 is block diagram of an aggregate index 410 consistent with the principles of the invention. Aggregate index 410 is comprised of a series of index entries corresponding to particular key values 1 to N. Each entry in aggregate index 410 is comprised of a key value 412, aggregate information 414 and one or more rowIDs 416. RowIDs 416 store the physical location of rows storing key value 412 as is commonly understood in the art.

Aggregate information 414 stores information associated with the rows stored at the one or more rowIDs 416. For example, aggregate information 414 might store an average of the items of information pointed to by rowIDs 416. Thus, when DBMS 312 performs an aggregate query with respect to key value 412, DBMS 312 merely accesses aggregate information 414 in aggregate index 410. The immediate access to aggregate information 414 eliminates the need for DBMS 312 to access all of the rows pointed to by rowIDs 416.

Aggregate information 414 can be any type of aggregate information associated with key value 412. For example, aggregate information 414 could be, but is not limited to, a sum, average, or minimum of the values stored at the rowIDs 416.

Aggregate information 414 may store several components that can be used individually or collectively by DBMS 312. For example, aggregate information 414 may store a sum and a count of the values corresponding to key value 412. DBMS 312 can use sum and count individually, or use them together to determine, for example, an average by dividing the sum by the count. In summary, aggregate information 414 comprises one or more aggregate components characterizing the values stored at rowIDs 416 corresponding to key value 412.

Aggregate information 414 is updated when there is a database operation affecting database rows associated with it. For example, if the aggregate information is a sum, when a new row storing key value 412 is inserted in the database, the value in the inserted row of the column to be aggregated must be added to the aggregate information 414 corresponding to key value 412. If the aggregate information comprises a sum and count, the sum and count are updated.

Figure 2:
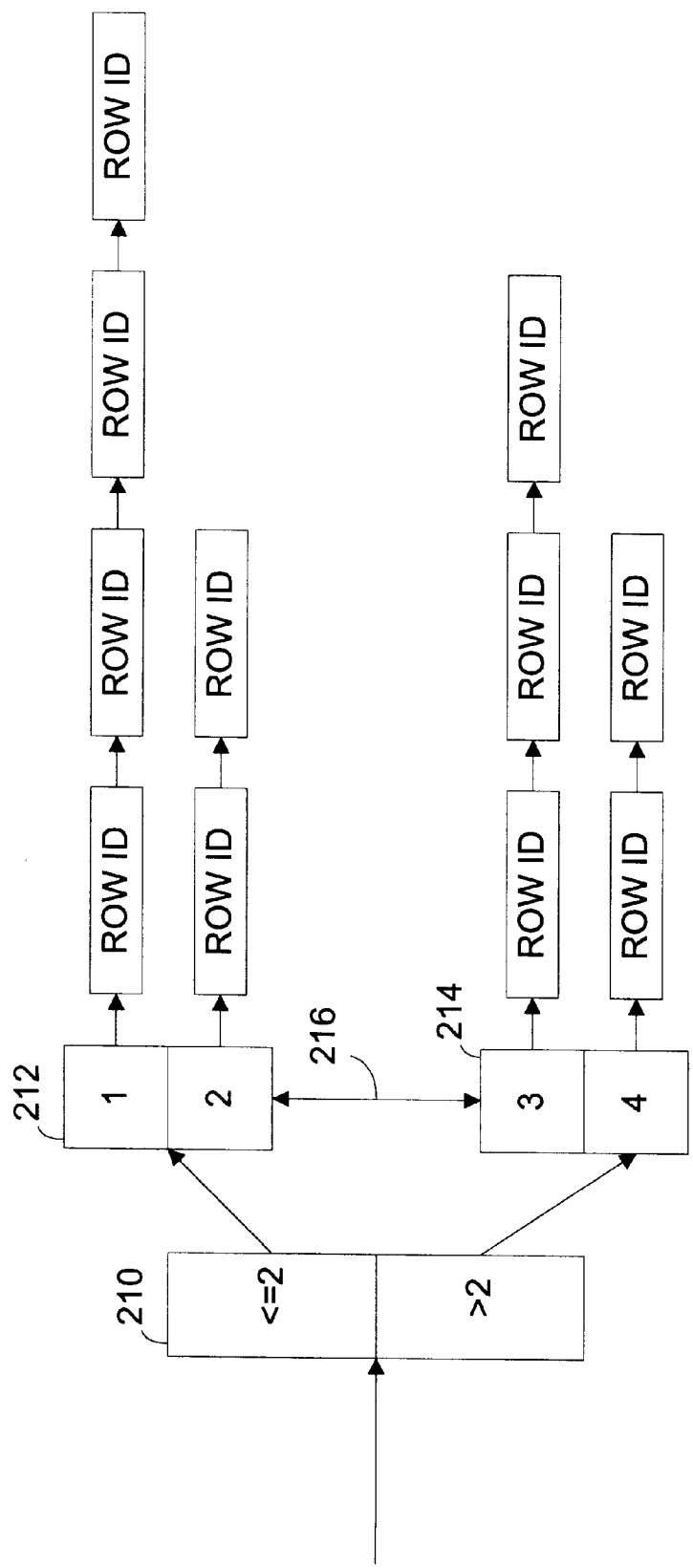
FIG. 2 is a block diagram of an index tree derived from table T.
Figure 5:
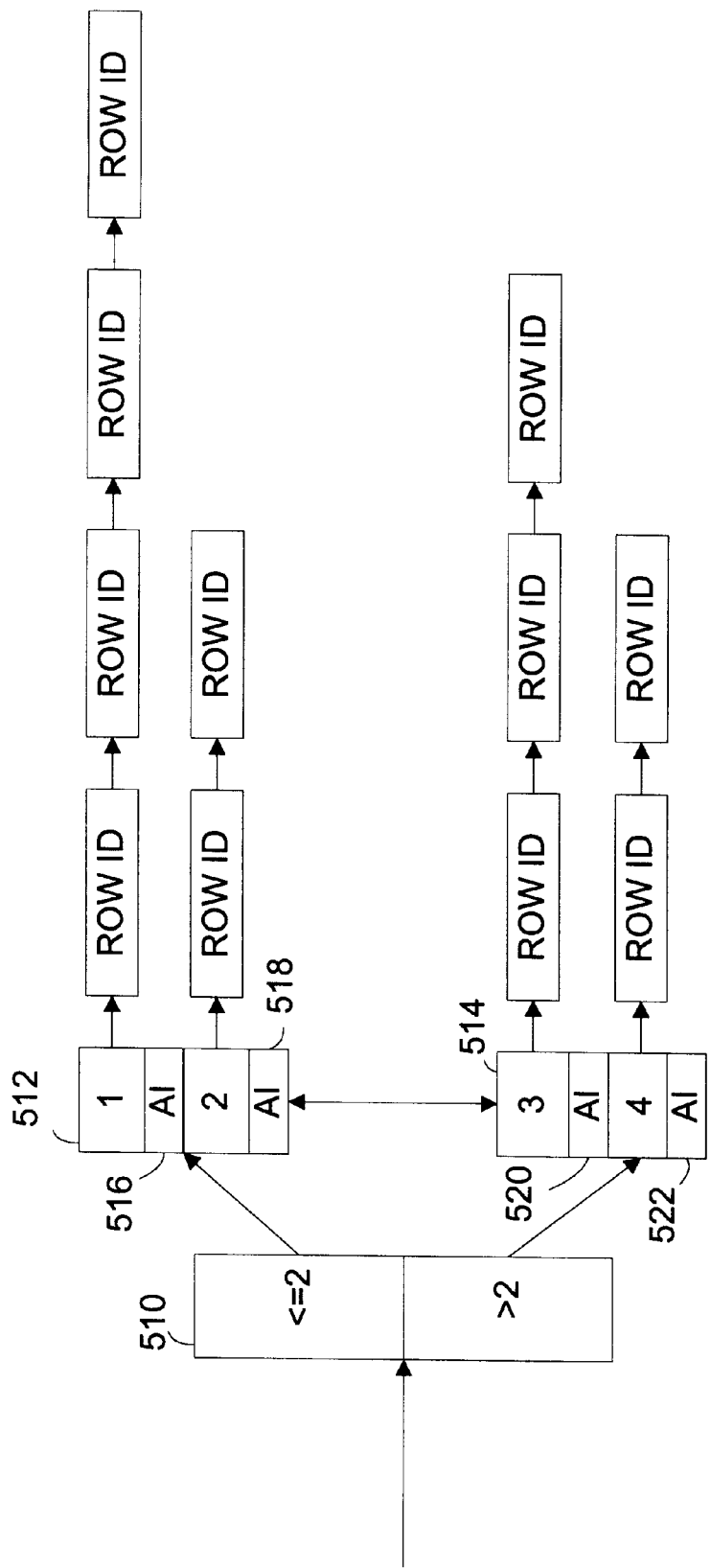
FIG. 5 is a block diagram of an aggregate index consistent with the principles of the present invention.

FIG. 5 is a block diagram of B-tree aggregate index for table 110 consistent with the principles of the present invention. The aggregate index has a structure similar to the index of FIG. 2, and further includes aggregate information (AIs) 516, 518, 520 and 522, respectively corresponding to particular key values. By precomputing and storing aggregate information in each leaf node, DBMS 312 only needs to traverse the index and access the leaf node corresponding to a particular key value to determine aggregate information for the table rows storing the particular key value. This eliminates the need to access each of the rows and to perform a calculation on values stored in the retrieved rows to determine the aggregate information.

Use of the aggregate index shown in FIG. 5 will now be described in the context of using such an index for determining average aggregate values. In this example, each aggregate information stored in the aggregate index of FIG. 5 is comprised of a sum and count of the number of rows having y values corresponding to a respective particular key value. values. Not only is this process time consuming, but also it must be repeated each time the aggregate information is needed. In contrast, systems consistent with the present invention merely access aggregate information 516 of leaf node 512 to find the sum and count, and calculate the average by dividing the sum by the count.

Figure 6:
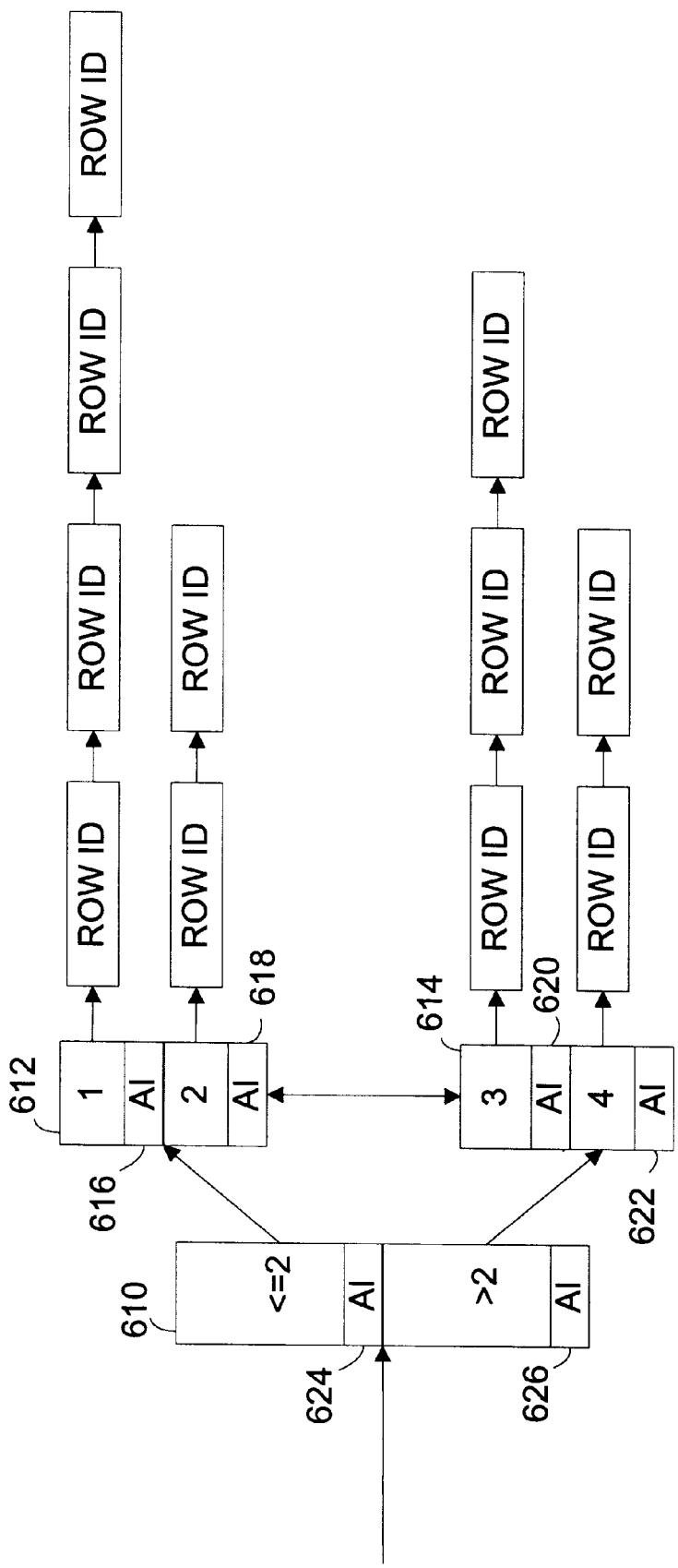
FIG. 6 is a block diagram of another aggregate index consistent with the principles of the present invention.

FIG. 6 is similar to FIG. 5, and additionally includes aggregate information 624 and 626 stored in branch node 610. These aggregate information elements are in addition to aggregate information 616 and 618 stored in leaf node 612, and aggregate information 620 and 622 stored in leaf node 614. Aggregate information 624 stores a characteristic of node 612, and aggregate information 626 stores a characteristic of node 614. The characteristic stored in the branch node aggregate information may be based on virtually any aspect of the nodes pointed to. Branch node aggregate information may be based on aggregate information of nodes in the branch pointed to by the branch node, or based on the values pointed to by the leaf nodes of the branch.

For example, aggregate information 624 may contain the sum of aggregate information elements 616 and 618, or a MIN of all values pointed to by the rowIDs associated with leaf node 612. Alternatively, the aggregate index of FIG. 6 may be implemented without aggregate information in the leaf nodes, and only have aggregate information in the branch nodes.

Creating Aggregate Indexes

DBMS 312 creates aggregate indexes by determining aggregate information for a branch or set of leaves associated with a node, and storing the information at the node.

Figure 7:
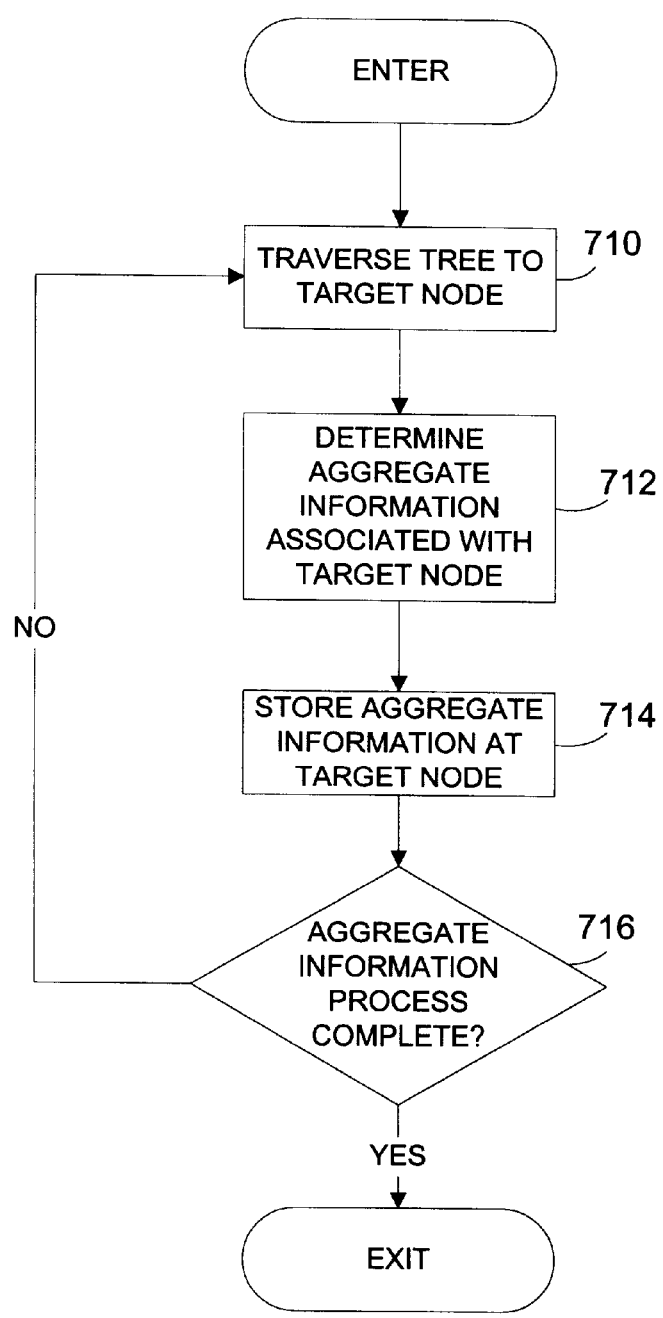
FIG. 7 is a flow chart of a process for creating the aggregate index in a manner consistent with the present invention.

FIG. 7 is a flow chart of the process performed by DBMS 312 for creating an aggregate index. DBMS 312 first traverses the index to a particular target node that will store aggregate information (step 710). At the target node, the aggregate information associated with that target node is determined (step 712), and stored at the target node (step 714). If the determination of aggregate information is complete for the index, the procedure exits, but repeats if more aggregate information needs to be determined (step 716).

Using Aggregate Indexes

Figure 8:
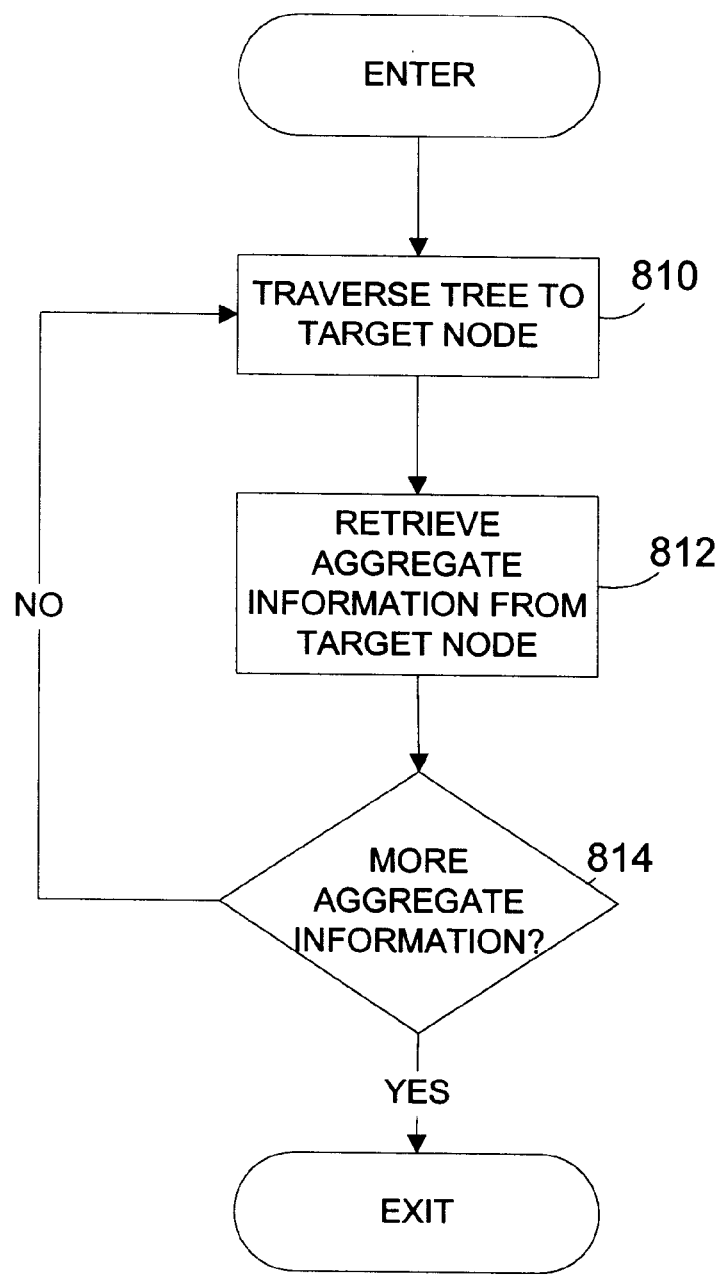
FIG. 8 is a flow chart of a process for using aggregate indexes by DBMS consistent with the principles of the present invention.

FIG. 8 is a flow chart of the process performed by DBMS 312 when processing database requests requiring aggregate information. In response to a query requiring aggregate information, DBMS 312 traverses the index to the target node containing the aggregate information (step 810). Aggregate information is then retrieved from the target node (step 812), and the process of traversing the tree to other target nodes continues until all required aggregate information has been determined (step 814). In some aggregate indexes not every node stores aggregate information. Therefore, in cases when requested aggregate information is not stored at each node, or when the aggregate index stores aggregate information which simply does not contain the requested aggregate information, the requested aggregate information must be computed from the branch nodes, leaf nodes or underlying tables.

Maintaining Aggregate Indexes

Figure 9:
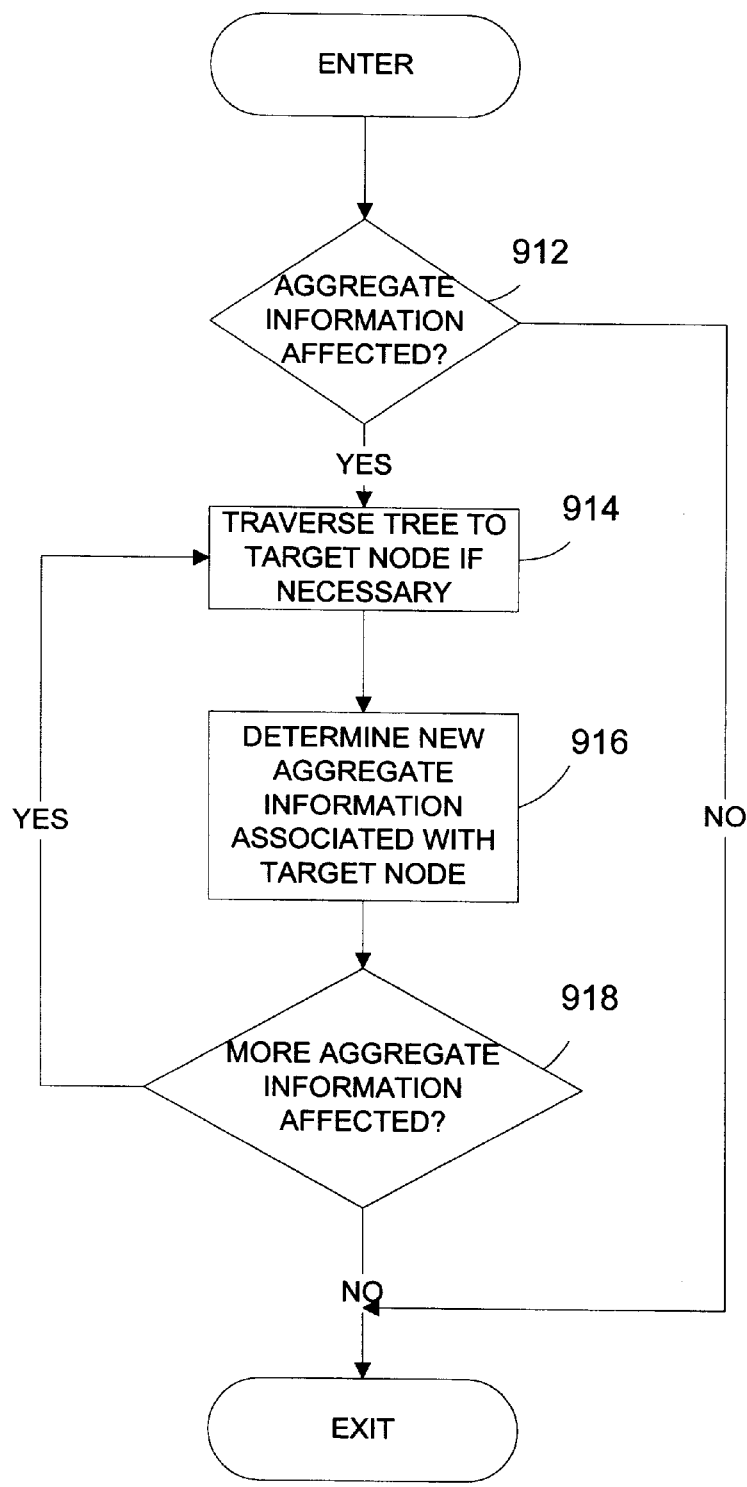
FIG. 9 is a flow chart of a process for maintaining the aggregate index consistent with the principles of the present invention.

FIG. 9 is a flow chart of the process performed by DBMS 312 to maintain the aggregate index. The process is executed any time there is an insertion, deletion, or update to database 314. To maintain the aggregate index, DBMS 312 first determines whether any aggregate information stored in the aggregate index are affected by the change to the database (step 912). If no aggregate information stored in the aggregate index is affected, the process is exited. If aggregate information is affected, however, the tree is traversed to the target node(s), if necessary (step 914).

There is a possibility that DBMS 312 used the aggregate index to perform an update of information in database 314. In this case, DBMS 312 is already at the leaf node corresponding to the change, and can update the aggregate information immediately. This eliminates the need for DBMS 312 to traverse the tree to the node storing the aggregate information affected by the database change. In either case, the new aggregate information associated with the target node is determined (step 916) and the process continues for each aggregate information element affected by the database change (step 918).

How aggregate information is updated depends on the type of aggregate information. Aggregate information is maintained in two ways: modifying current aggregate information using only the current aggregate information, and data from an inserted, deleted or modified row ("incremental" update), or accessing aggregate information or table rows to compute entirely new aggregate information. For example, if the aggregate information comprises a sum of the values for a particular column in the rows storing a particular key, when a new row storing the key is added to the database the aggregate information is updated by adding the new row's value for the particular column to the old aggregate information.

Some aggregate information, however, requires recomputing the aggregate information from database values in the underlying database tables. For example, for MIN aggregate information, the aggregate information stores the lowest value, MIN, for all rows corresponding to a particular key, and a count value indicating the number of rows storing the MIN value. Thus, if there is only one row containing the MIN value, when that row is deleted a new MIN value and the number of rows containing the new MIN value must be recomputed from the underlying table. Similarly, if a new row is added that contains the same value as the current MIN value, the count value must be incremented.

Therefore, maintenance of the aggregate information depends on the type of operation being performed on the database, and the type of aggregate information that is updated. Some aggregate information can be updated incrementally, whereas others require accessing the underlying database.

Computer System

Figure 10:
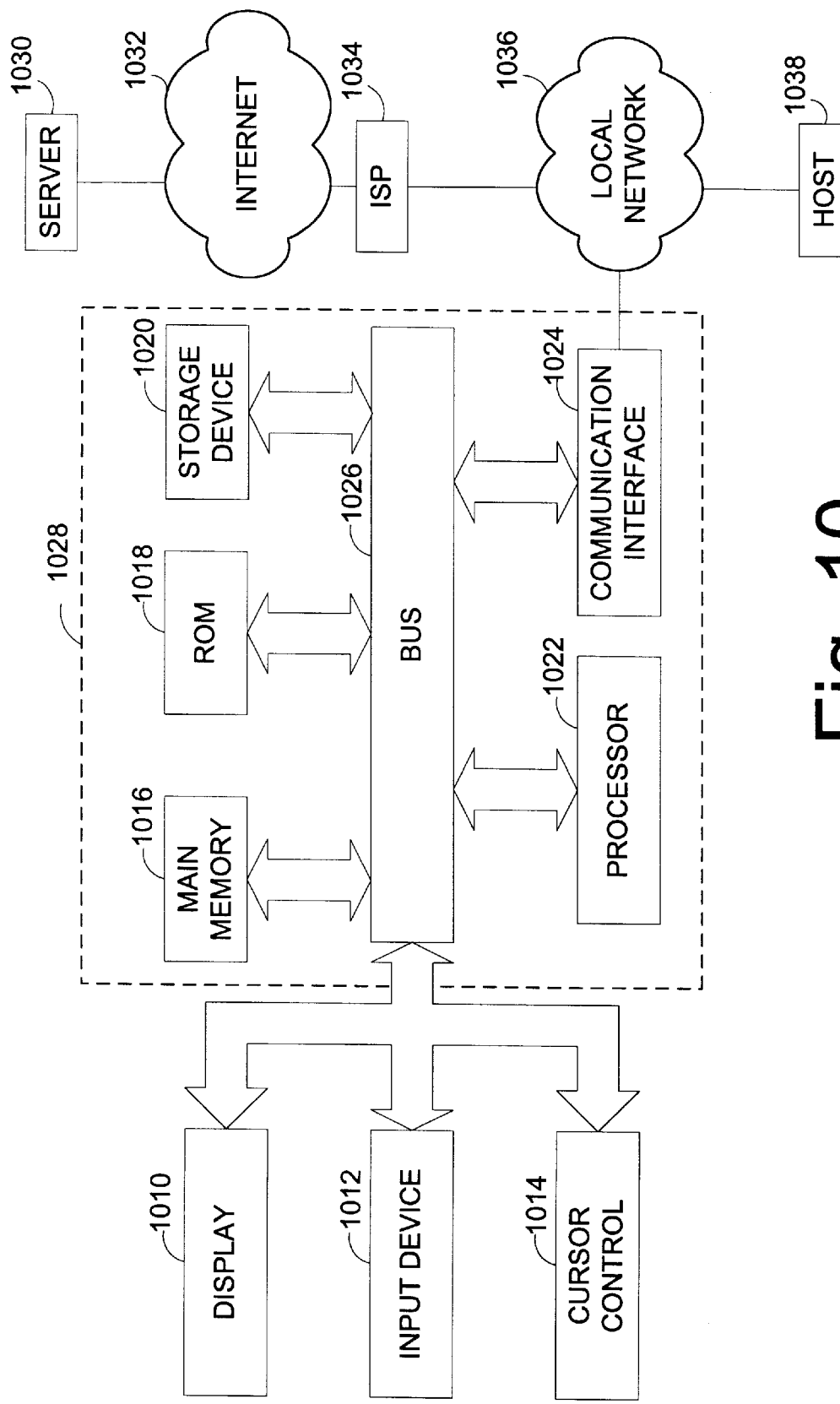
FIG. 10 is a block diagram illustrating a computer system, which may be used to implement an aggregate index consistent with the principles of the present invention.

FIG. 10 is a block diagram illustrating a computer system that may be used to implement an aggregate index consistent with the principles of the present invention. Computer system 1028 is a general purpose computer system that includes main memory 1016, read only memory (ROM) 1018, storage device 1020, processor 1022, and communication interface 1024, all interconnected by bus 1026. Bus 1026 also connects computer system 1028 to display 1010, input device 1012, and cursor control 1014.

In one embodiment, main memory 1016 is a random access memory (RAM) or a dynamic storage device that stores instructions executed by processor 1022. Main memory 1016 may also store information used in executing instructions. ROM 1018 is used for storing static information and instructions used by processor 1022. Storage device 1020, such as a magnetic or optical disk, also stores instructions and data used in the operation of computer system 1028.

Display 1010 may be a CRT or other type of display device. Input device 1012 is used by a user to input data and commands to processor 1022 to allow the user to interact with the system. Cursor control 1014 controls cursor movement on display 1010. Cursor control 1014 may be, for example, a mouse, a trackball or cursor direction keys.

The system shown in FIG. 10 can be used to implement the database system shown in FIG. 3. User interface 310 may be implemented by display 1010, input device 1012 and cursor control 1014; DBMS 312 may be implemented as a program in any one or more of main memory 1016, ROM 1018, or storage device 1020; and, database 314 may be implemented on storage device 1020 or other storage media. Processor 1022 executes the DBMS program, thus carrying out the functionality of DBMS 312.

The apparatus, systems and methods consistent with the present invention and disclosed herein are related to the use of computer system 1028 creating, using and maintaining aggregate indexes. According to one embodiment of the invention, aggregate indexes are created by computer system 1028 in response to processor 1022 executing one or more sequences of instructions contained in main memory 1016. Such instructions may be read into main memory 1016 from another computer-readable medium, such as storage device 1020. Execution of sequences of instructions contained in main memory 1016 causes processor 1022 to perform the process steps consistent with the present invention described herein. Execution of sequences of instructions contained in main memory 1016 also causes processor to implement apparatus elements that perform the process steps. Hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1022 for execution. Such a medium may take many forms, including but not limited to, non-volatile memory media, volatile memory media, and transmission media. Non-volatile memory media includes, for example, optical or magnetic disks, such as storage device 1020. Volatile memory media includes RAM, such as main memory 1016. Transmission media includes coaxial cables, copper wire and fiber optics, including the wires that comprise bus 1026. Transmission media can also take the form of acoustic or light waves, such as those generated during radiowave and infrared data communications.

Common forms of computer-readable media include, for example, a floppy disk, a flexible disk, hard disk, magnetic tape, or any other magnetic storage medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read and use.

Various forms of computer readable media may be involved in carrying one or more sequences of instructions to processor 1022 for execution. For example, the instructions may initially be carried on a magnetic disk or a remote computer. The remote computer can load the instructions into its dynamic memory and send the instructions over a telephone line using a modem. A modem local to computer system 1028 can receive the data on the telephone line and use an infrared transmitter to convert the data to an infrared signal. An infrared detector coupled to appropriate circuitry can receive the data carried in the infrared signal and place the data on bus 1026. Bus 1026 carries the data to main memory 1016, from which processor 1022 retrieves and executes the instructions. The instructions received by main memory 1016 may optionally be stored on storage device 1020 either before or after execution by processor 1022.

Computer system 1028 also includes a communication interface 1024 coupled to bus 1026. Communication interface 1024 provides two way communications to other systems, such as a local network 1036. For example, communication interface 1024 may be an integrated services digital network (ISDN) card or a modem to provide a data communication connection to a corresponding type of telephone line. Communication may also be, for example, a local area network (LAN) card to provide communication to a LAN. Communication interface 1024 may also be a wireless card for implementing wireless communication between computer system 1028 and wireless systems. In any such implementation, communication interface 1024 sends and receives electrical, electromagnetic or optical signals that carry data streams representing various types of information.

The link between communication interface 1024 and local network 1036 typically provides data communication through one or more networks or other devices. For example, the link may provide a connection to local network 1036 to a host computer 1038 or to data equipment operated by an Internet Service Provider (ISP) 1034. ISP 1034 provides data communication services through the world wide packet data communications network now commonly referred to as the "Internet" 1032. Local network 1036 and Internet 1032 both use electrical, electromagnetic or optical signals that carry digital data streams. The signals through the various networks and the signals between communication interface 1024 and local network 1036, which carry the digital data to and from computer system 1028, are exemplary forms of carrier waves transporting the information.

Computer system 1028 can send messages and receive data, including program code, through the network(s) via the link between communication interface 1024 and local network 1036. In Internet 1032, for example, a server 1030 might transmit a requested code for an application program through Internet 1032, ISP 1034, local network 1036, and communication interface 1024.

Program code received over the network may be executed by processor 1022 as it is received, and/or stored in memory, such as in storage device 1020, for later execution. In this manner, computer system 1028 may obtain application code in the form of a carrier wave.

Conclusion

It will be apparent to those skilled in the art that various modifications and variations can be made in the aggregate index apparatus, systems, and methods consistent with the principles of the present invention without departing from the scope or spirit of the invention.

The principles of the aggregate index disclosed herein can be applied to any index. For example, the aggregate index can be based on bitmap index or hash index structures. The aggregate index extends an index for a database by maintaining aggregate information corresponding to one or more key values.

Aggregate information could comprise any value or values related to one or more key ranges or one or more key values. Aggregate information might include, but is not limited to, SUM, COUNT, or AVG. In one embodiment, the aggregate information is incrementally manageable. That is, when an operation is performed on the table (insert, delete or update) that requires computing new aggregate information for the one or more key values affected by the operation, the new aggregate information is determined solely from the old aggregate information and the value associated with the insert, delete or update, without requiring access to any table rows.

Maintaining MIN or MAX aggregate information, however, might require accessing one or more table rows in order to determine the new MIN or MAX value. An aggregate index storing MIN or MAX aggregate information, however, may still be desirable given a high enough frequency of queries requesting the MAX or MIN information relative to the frequency of changes to the table because the MIN or MAX information need not be recomputed from the corresponding table rows each time they are requested by a query.

Although FIGS. 5 and 6 show nodes having aggregate information associated each key value of the node, nodes may alternatively store aggregate information in other ways. For example, node 512 may have aggregate information comprising a single aggregate value for one key value, and no aggregate information for other key value of the node. Alternatively, node 512 may have aggregate information storing multiple types of values for either or both of key values in the node.

In an alternative embodiment, the aggregate indexes of FIGS. 5 and 6 may be implemented without rowIDs or bitmaps associated with the key values. Such an index would merely be comprised of branch and leaf nodes storing aggregate information associated with the underlying table.

These principles apply whether the aggregate index is a B-tree having branch nodes and leaf nodes, or is another type of index structure. That is, aggregate information can be stored in the entries of any type of index.

Aggregate indexes (storing incrementally manageable aggregate information) do not significantly add to the computational cost of DBMS 312 performing inserts or deletes to a database already having a traditional index for rowIDs since even without the storage of aggregate information the index must be updated after such operations. Thus, when storing aggregate information that is updated or added as a result of an operation, the current index maintenance path for ordinary indexes can be followed. Aggregate indexes do, however, increase the computational cost of performing update operations because an ordinary index only needs to be updated if the update operation affects one or more of the key columns. Aggregate indexes must be updated when the update affects any column upon which aggregate information is based.

One advantage of the present invention is that aggregate information can be obtained using a standard index path to a table. Where the index key columns are highly non-unique (i.e., many rows have the same key value), the retrieval of aggregate information from an aggregate index is more efficient than the recomputing aggregate information from the table. Recomputing involves accessing each of the rows in the table having a particular key value.

Implementing the database architecture of FIG. 3 on the hardware architecture of FIG. 10 is only one of many possible implementations, and should not be considered to limit the claims in any way. One of ordinary skill in the art will recognize that the creation, use and maintenance of aggregate indexes may be implemented on any database system that requires aggregate information. Therefore, the hardware architecture of FIG. 10 and database architecture of FIG. 3 are only one of the many combinations of hardware and database architectures that may use aggregate indexes. For example, aggregate indexes consistent with the principles of the present invention may also be practiced on distributed database systems, distributed index systems, and distributed processor systems.

Furthermore, database 314 may be implemented locally in storage device 1020, or in whole or in part remotely, such as on host 1038 or server 1030, or in a combination of such devices. Similarly, DBMS 312 could be implemented locally as a program in one of main memory 1016, ROM 1018 or storage device 1020, but may also be implemented in whole or in part remotely from computer system 1028.

Other embodiments of the invention will be apparent to those skilled in the art from consideration of the specification and practice of the disclosed embodiments. The specification and examples are exemplary only, and the following claims and their equivalents define the true scope and spirit of the invention.

I claim:

1. A method for storing aggregate information in an entry of a database index for a database table, comprising:

storing, in the entry that corresponds to a key value, information that indicates where two or more database table rows that have the key value are located in the database table;

computing first aggregate information based on an aggregate operation and said two or more database table rows; and storing the first aggregate information in the entry.

2. The method of claim 1, further including:

accessing values in the two or more database table rows; and wherein the step of computing the first aggregate information is performed by performing the aggregate operation based on the values.

3. The method of claim 1, further including:

accessing second aggregate information stored in the entry; and wherein the step of computing the first aggregate information uses the second aggregate information.

4. The method of claim 1, wherein the first aggregate information represents a sum of values stored in a column of the two or more database table rows.

5. The method of claim 1, wherein the first aggregate information represents an average of values stored in a column of the two or more database table rows.

6. The method of claim 1, wherein the first aggregate information represents a count of the two or more database table rows.

7. The method of claim 1, wherein the first aggregate information represents a minimum among values stored in a column of the two or more database table rows.

8. The method of claim 1, wherein the first aggregate information represents a maximum among values stored in a column of the two or more database table rows.

9. A computer-readable medium having stored thereon sequences of instructions for storing aggregate information in an entry of a database index for a database table, the sequences of instructions including instructions which, when executed by a processor, cause the processor to perform the steps of:

storing, in the entry that corresponds to a key value, information that indicates where two or more database table rows that have the key value are located in the database table;

computing first aggregate information based on an aggregate operation and said two or more database table rows; and storing the first aggregate information in the entry.

10. The computer-readable medium of claim 9, further including instructions for:

accessing values in the two or more database table rows; and wherein the instructions for computing the first aggregate information include instructions for performing the aggregate operation based on the values.

11. The computer-readable medium of claim 9, further including instructions for:

accessing second aggregate information stored in the entry; and wherein the instructions for computing the first aggregate information use the second aggregate information.

12. The computer-readable medium of claim 9, wherein the first aggregate information represents a sum of values stored in a column of the two or more database table rows.

13. The computer-readable medium of claim 9, wherein the first aggregate information represents an average of values stored in a column of the two or more database table rows.

14. The computer-readable medium of claim 9, wherein the first aggregate information represents a count of the two or more database table rows.

15. The computer-readable medium of claim 9, wherein the first aggregate information represents a minimum among values stored in a column of the two or more database table rows.

16. The computer-readable medium of claim 9, wherein the first aggregate information represents a maximum among values stored in a column of the two or more database table rows.

17. A method for storing aggregate information in a first entry of a database index for a database table, comprising:

storing, in the first entry that corresponds to a range of key values, information that indicates where two or more database table rows that have respective key values are located in the database table, wherein each of said key values is within the range of key values;

computing first aggregate information based on an aggregate operation and said two or more database table rows; and storing the first aggregate information in the first entry.

18. The method according to claim 17, further including:

accessing second aggregate information stored in a second entry of the database index; and wherein the step of computing the first aggregate information uses the second aggregate information.

19. The method according to claim 17, further including:

accessing data in one or more database table rows having respective key values in the range of key values; and wherein the step of computing the first aggregate information uses the data.

20. The method of claim 17, wherein the first aggregate information represents an average of values stored in a column of the two or more database table rows.

21. The method of claim 17, wherein the first aggregate information represents a count of the two or more database table rows.

22. The method of claim 17, wherein the first aggregate information represents a minimum among values stored in a column of the two or more database table rows.

23. The method of claim 17, wherein the first aggregate information represents a maximum among values stored in a column of the two or more database table rows.

24. A computer-readable medium having stored thereon sequences of instructions for storing aggregate information in a first entry of a database index for a database table, the sequences of instructions including instructions which, when executed by a processor, cause the processor to perform the steps of:

storing, in the first entry that corresponds to a range of key values, information that indicates where two or more database table rows that have respective key values are located in the database table, wherein each of said key values is within the range of key values;

computing first aggregate information based on an aggregate operation and said two or more database table rows; and storing the first aggregate information in the first entry.

25. The computer-readable medium of claim 24, further including:

accessing second aggregate information stored in a second entry of the database index; and wherein the instructions for computing the first aggregate information use the second aggregate information.

26. The computer-readable medium of claim 24, further including instructions for:

accessing data in one or more database table rows having respective key values in the range of key values; and wherein the instructions for computing the first aggregate information use the data.

27. The computer-readable medium of claim 24, wherein the first aggregate information represents an average of values stored in a column of the two or more database table rows.

28. The computer-readable medium of claim 24, wherein the first aggregate information represents a count of the two or more database table rows.

29. The computer-readable medium of claim 24, wherein the first aggregate information represents a minimum among values stored in a column of the two or more database table rows.

30. The computer-readable medium of claim 24, wherein the first aggregate information represents a maximum among values stored in a column of the two or more database table rows.

31. A method for accessing aggregate information stored in an entry of a database index for a database table, comprising:

storing, in the entry that corresponds to a key value, information that indicates where two or more database table rows that have the key value are located in the database table;

receiving a database query requiring information based on said two or more database table rows;

accessing aggregate information from the entry; and providing an aggregate value using the aggregate information.

32. The method of claim 31, wherein the database index is implemented as a tree and the step of accessing includes:

traversing the database index to a leaf node containing the aggregate information.

33. The method of claim 31, wherein the database index is implemented as a tree and the step of accessing includes:

traversing the database index to a branch node containing the aggregate information.

34. The method of claim 31, wherein the aggregate information represents an average of values stored in a column of the two or more database table rows.

35. The method of claim 31, wherein the aggregate information represents a count of the two or more database table rows.

36. The method of claim 31, wherein the aggregate information represents a minimum among values stored in a column of the two or more database table rows.

37. The method of claim 31, wherein the aggregate information represents a maximum among values stored in a column of the two or more database table rows.

38. A computer-readable medium having stored thereon sequences of instructions for accessing aggregate information stored in an entry of a database index for a database table, the sequences of instructions including instructions which, when executed by a processor, cause the processor to perform the steps of:

storing, in the entry that corresponds to a key value, information that indicates where two or more database table rows that have the key value are located in the database table;

receiving a database query requiring information based on said two or more database table rows;

accessing aggregate information from the entry; and providing an aggregate value using the aggregate information.

39. The computer-readable medium of claim 38, wherein the database index is implemented as a tree, and the instructions for accessing include instructions for:

traversing the database index to a leaf node containing the aggregate information.

40. The computer-readable medium of claim 38, wherein the database index is implemented as a tree, and the instructions for accessing include instructions for:

traversing the database index to a branch node containing the aggregate information.

41. The computer-readable medium of claim 38, wherein the aggregate information represents an average of values stored in a column of the two or more database table rows.

42. The computer-readable medium of claim 38, wherein the aggregate information represents a count of the two or more database table rows.

43. The computer-readable medium of claim 38, wherein the aggregate information represents a minimum among values stored in a column of the two or more database table rows.

44. The computer-readable medium of claim 38, wherein the aggregate information represents a maximum among values stored in a column of the two or more database table rows.

45. A method for updating aggregate information in an entry of a database index for a database table, comprising:

storing, in the entry that corresponds to a key value, information that indicates where two or more database table rows that have the key value are located in the database table;

storing aggregate information in the entry;

performing a database table operation related to the key value; and updating the aggregate information in accordance with the database table operation.

46. The method of claim 45, wherein the step of performing the database table operation includes:

inserting a database table row into the database table.

47. The method of claim 45, wherein the step of performing the database table operation includes:

deleting a database table row from the database table.

48. The method of claim 45, wherein the step of performing the database table operation includes:

modifying a database table row in the database table.

49. The method of claim 45, wherein the step of updating the aggregate information includes:

reading first aggregate information from the entry;

computing second aggregate information using the first aggregate information and a value that is affected by the database table operation; and storing the second aggregate information in the entry.

50. The method of claim 45, wherein the step of updating the aggregate information includes:

reading database table information from the two or more database table rows after completion of the database table operation;

computing new aggregate information based on the database table information; and storing the new aggregate information in the entry.

51. A computer-readable medium having stored thereon sequences of instructions for updating aggregate information in an entry of a database index for a database table, the sequences of instructions including instructions which, when executed by a processor, cause the processor to perform the steps of:
   storing, in the entry that corresponds to a key value, information that indicates where two or more database table rows that have the key value are located in the database table;
   storing aggregate information in the entry;
   performing a database table operation related to the key value; and
   updating the aggregate information in accordance with the database table operation.

52. The computer-readable medium of claim 51, wherein the instructions for performing the database table operation include instructions for:
   inserting a database table row into the database table.

53. The computer-readable medium of claim 51, wherein the instructions for performing the database table operation include instructions for:
   deleting a database table row from the database table.

54. The computer-readable medium of claim 51, wherein the instructions for performing the database table operation include instructions for:
   modifying a database table row in the database table.

55. The computer-readable medium of claim 51, wherein the instructions for updating the aggregate information include instructions for:
   reading first aggregate information from the entry;
   computing second aggregate information using the first aggregate information and a value that is affected by the database table operation; and
   storing the second aggregate information in the entry.

56. The computer-readable medium of claim 51, wherein the instructions for updating the aggregate information include instructions for:
   reading database table information from the two or more database table rows after completion of the database table operation;
   computing new aggregate information based on the database table information; and
   storing the new aggregate information in the entry.

57. The method of claim 17, wherein the first aggregate information represents a sum of values stored in a column of the two or more database table rows.

58. The computer-readable medium of claim 24, wherein the first aggregate information represents a sum of values stored in a column of the two or more database table rows.

59. The method of claim 31, wherein the aggregate information represents a sum of values stored in a column of the two or more database table rows.

60. The computer-readable medium of claim 38, wherein the aggregate information represents a sum of values stored in a column of the two or more database table rows.

61. The method of claim 1, wherein the step of storing, in the entry that corresponds to the key value, information that indicates where said two or more database table rows that have the key value are located in the database table comprises the step of:
   storing, in the entry that corresponds to the key value, information that specifies a row identifier that identifies where said two or more database table rows that have the key value are located in the database table.

62. The method of claim 1, wherein the step of computing the first aggregate information comprises the step of:
   computing the first aggregate information based on the aggregate operation and at least one value from each of said two or more database table rows.

63. The computer-readable medium of claim 9, wherein the instructions for storing, in the entry that corresponds to the key value, information that indicates where said two or more database table rows that have the key value are located in the database table include instructions for:
   storing, in the entry that corresponds to the key value, information that specifies a row identifier that identifies where said two or more database table rows that have the key value are located in the database table.

64. The computer-readable medium of claim 9, wherein the instructions for computing the first aggregate information include instructions for:
   computing the first aggregate information based on the aggregate operation and at least one value from each of said two or more database table rows.

65. The method of claim 17, wherein the step of storing, in the first entry that corresponds to the range of key values, information that indicates where said two or more database table rows that have respective key values are located in the database table comprises the step of:
   storing, in the first entry that corresponds to the range of key values, information that specifies a row identifier that identifies where said two or more database table rows that have respective key values are located in the database table.

66. The method of claim 17, wherein the step of computing the first aggregate information comprises the step of:
   computing the first aggregate information based on the aggregate operation and at least one value from each of said two or more database table rows.

67. The computer-readable medium of claim 24, wherein the instructions for storing, in the first entry that corresponds to the range of key values, information that indicates where said two or more database table rows that have respective key values are located in the database table include instructions for:
   storing, in the first entry that corresponds to the range of key values, information that specifies a row identifier that identifies where said two or more database table rows that have respective key values are located in the database table.

68. The computer-readable medium of claim 24, wherein the instructions for computing the first aggregate information include instructions for:
   computing the first aggregate information based on the aggregate operation and at least one value from each of said two or more database table rows.

69. The method of claim 31, wherein the step of storing, in the entry that corresponds to the key value, information that indicates where said two or more database table rows that have the key value are located in the database table comprises the step of:
   storing, in the entry that corresponds to the key value, information that specifies a row identifier that identifies where said two or more database table rows that have the key value are located in the database table.

70. The method of claim 31, wherein the step of receiving the database query requiring the aggregate value comprises the step of:
   receiving the database query requiring the information based on at least one value from each of said two or more database table rows.

71. The computer-readable medium of claim 38, wherein the instructions for storing, in the entry that corresponds to the key value, information that indicates where said two or more database table rows that have the key value are located in the database table include instructions for:

storing, in the entry that corresponds to the key value, information that specifies a row identifier that identifies where said two or more database table rows that have the key value are located in the database table.

72. The computer-readable medium of claim 38, wherein the instructions for receiving the database query requiring the aggregate value include instructions for:

receiving the database query requiring the information based on at least one value from each of said two or more database table rows.

73. The method of claim 45, wherein the step of storing, in the entry that corresponds to the key value, information that indicates where said two or more database table rows that have the key value are located in the database table comprises the step of:

storing, in the entry that corresponds to the key value, information that specifies a row identifier that identifies where said two or more database table rows that have the key value are located in the database table.

74. The computer-readable medium of claim 51, wherein the instructions for storing, in the entry that corresponds to the key value, information that indicates where said two or more database table rows that have the key value are located in the database table include instructions for:

storing, in the entry that corresponds to the key value, information that specifies a row identifier that identifies where said two or more database table rows that have the key value are located in the database table.

\* \* \* \* \*